J. H. WAGENHORST.
VEHICLE WHEEL RIM.
APPLICATION FILED JAN. 16, 1912.
1,063,480.
Patented June 3, 1913.
2 SHEETS—SHEET 1.
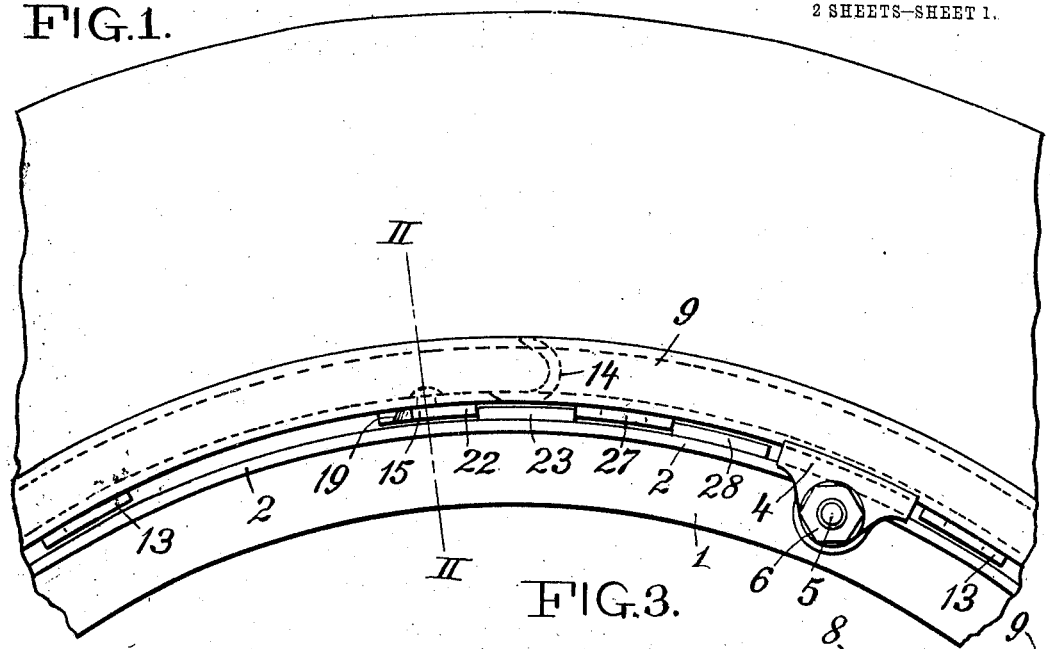
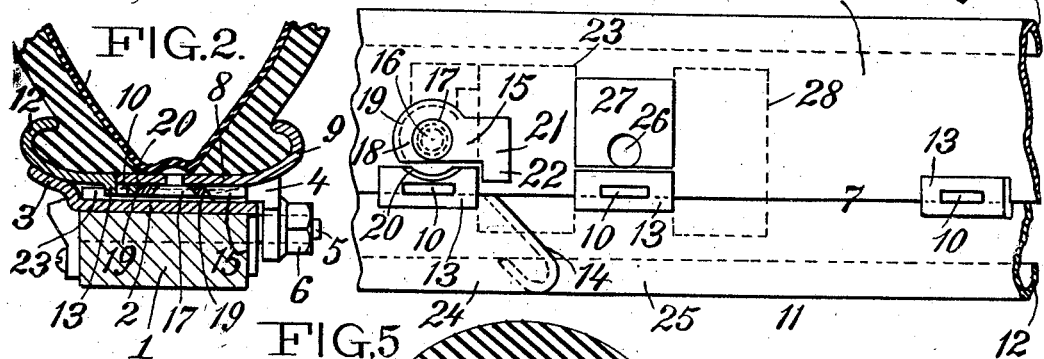
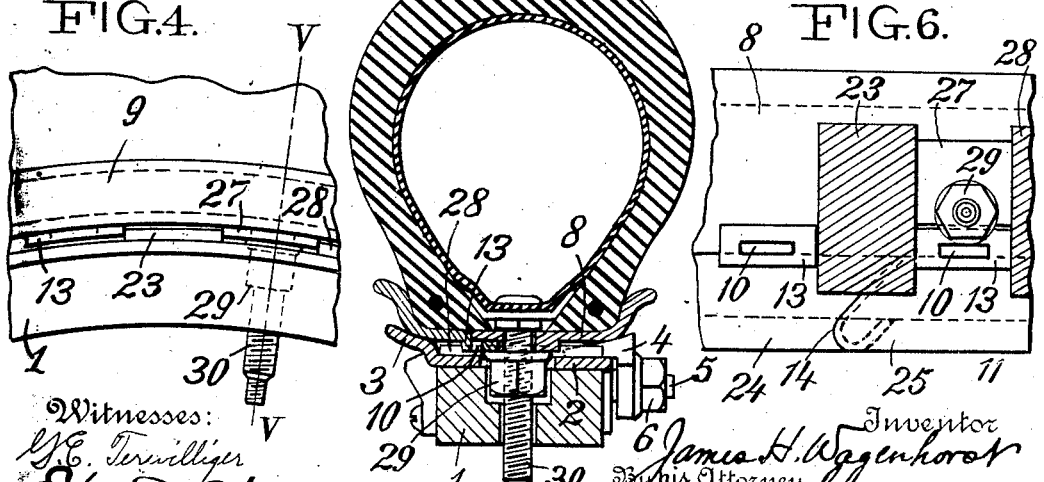

J. H. WAGENHORST.
VEHICLE WHEEL RIM.
APPLICATION FILED JAN. 16, 1912.
1,063,480.
Patented June 3, 1913.
2 SHEETS—SHEET 2.
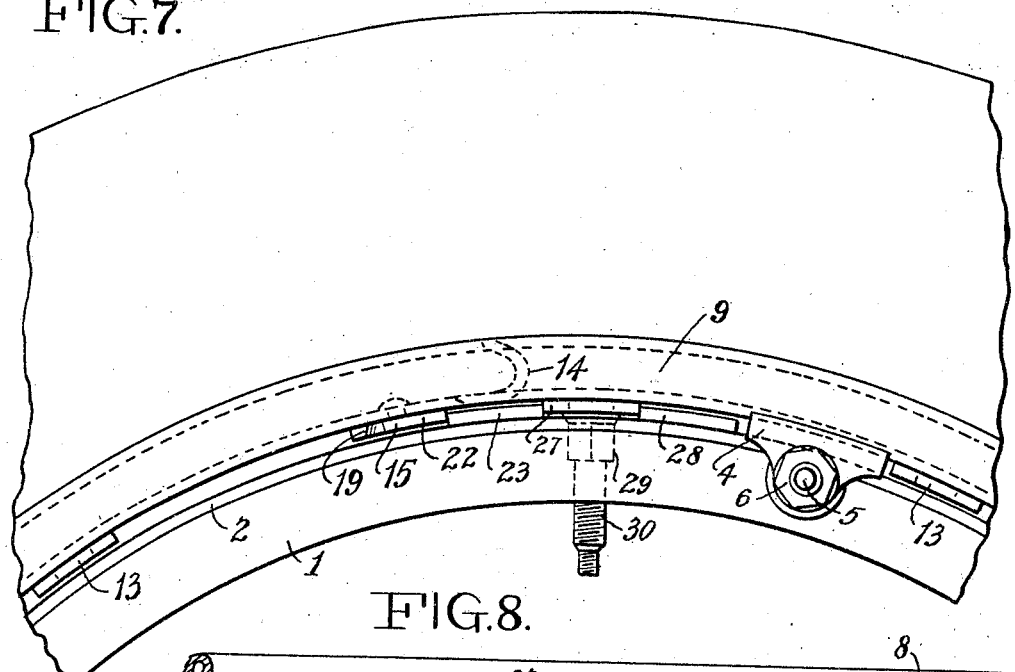
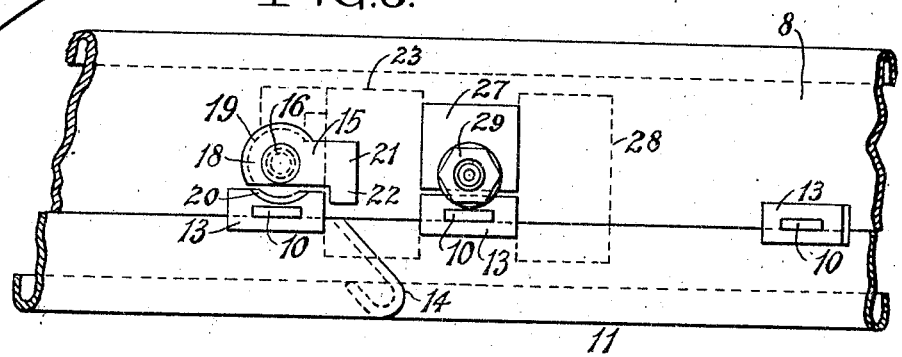
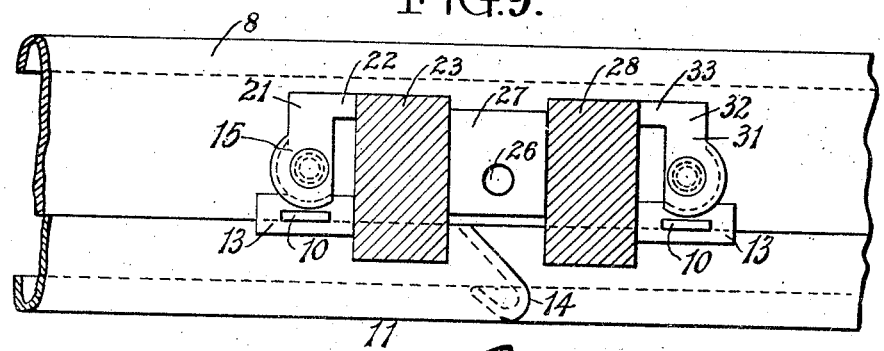

UNITED STATES PATENT OFFICE.

JAMES H. WAGENHORST, OF AKRON, OHIO.

VEHICLE WHEEL-RIM.

1,063,480.   Specification of Letters Patent.   Patented June 3, 1913.

Application filed January 16, 1912. Serial No. 671,492.

*To all whom it may concern:*

Be it known that I, JAMES H. WAGEN-HORST, a citizen of the United States, residing in the city of Akron, county of Summit, and State of Ohio, have invented certain new and useful Improvements in Vehicle Wheel-Rims, of which the following is a specification.

This invention relates to improvements in vehicle wheel rims of that class adapted to carry pneumatic or other resilient tires.

It contemplates an improved structure of tire-carrying rim adapted to be removably mounted upon a vehicle wheel, the rim being separable in such manner as to facilitate the application and removal of the resilient tire and to permit the application thereto of pneumatic or other resilient tires with inextensible beads. In order to accomplish this purpose the rim is constructed of two annular rings adapted to be separably connected along their adjacent circumferential edges, one of the rings being transversely split.

The present invention relates particularly to locking means for securing the ends of this split ring in position.

In the accompanying drawings which form a part of this specification, Figure 1 is a side elevation of a portion of a wheel felly having one form of my improved rim mounted thereon, the rim carrying a pneumatic tire; Fig. 2 is a section on line II—II of Fig. 1; Fig. 3 is a plan view of the under-side of a portion of the rim shown in Fig. 1 removed from the wheel; Fig. 4 is a side elevation of a portion of a wheel felly, rim and tire, the rim embodying a modification of my invention; Fig. 5 is a section on line V—V of Fig. 4; Fig. 6 is a view of the under-side of a portion of the rim shown in Figs. 4 and 5, the driving plates secured to the felly band being shown in section; Fig. 7 is a side elevation of a portion of a wheel felly, rim and tire embodying a modification of my invention; Fig. 8 is a bottom view of this modification, the felly and its associated parts being omitted; Fig. 9 is a bottom view showing a modification of the structure of Fig. 3.

Referring to the drawings in detail, the numeral 1 designates the wheel felly, to which is permanently secured, by shrinking or otherwise, the felly band 2, which may be provided at one side thereof with the raised flange 3 adapted to support one side of the tire-carrying rim, the other side of the tire-carrying rim being supported in any suitable manner, as by means of the wedges 4 secured to the felly by means of bolts 5 and nuts 6. The tire-carrying rim 7 consists of two members, one of which is the endless annular member 8 provided at one edge with the tire-retaining flange or clench 9, and at the other edge with a series of downwardly turned lugs 10. The other member of the tire-carrying rim consists of a ring 11 provided at one edge with a tire-retaining flange or clench 12, and at the other edge with a series of inwardly or downwardly offset slotted lugs 13 which project beneath the edge of the endless annular member 8. The lugs 10 are received in the slots in the lugs 13, and the two rings forming the rim are thus locked together.

In order to render possible the engagement and disengagement of the lugs 10 and 13, the ring 11 is transversely split, as indicated, at 14, the plane of the split being preferably inclined both to the edges of the ring and to the surface of the cylindrical part of the ring, as shown in Fig. 3.

A rim having the general characteristics thus far described is illustrated and claimed broadly in my application Serial Number 628,385, filed May 20, 1911. The claims of the said application which relate to the construction of the tire-carrying rim itself are drawn to cover a different species of the broad invention disclosed and claimed in that application from that claimed in some of the more specific claims of the present application.

The present invention relates primarily to means for locking the ends of the split ring in position so as to prevent the accidental detachment of this ring from the endless member of the rim, and also to certain features of construction of the rim members. The means for accomplishing this purpose, illustrated in Fig. 3, comprise the latch 15 pivoted to the under-side of the endless ring 8 by means of a pivot 16 having the conical head 17. The latch 15 comprises a segmental portion 18 having an under-cut face 19 preferably concentric with the pivot 16. This face is adapted to engage with a concave beveled face 20, formed upon one of the lugs 13, when the latch is rotated to operative position, in which position it is shown in Figs. 1 and 2, and indicated in dotted lines in Fig. 3. The latch is provided with a head 21 preferably provided with an extension 22, the head forming means by which the latch may be engaged by a wrench or the like in order to rotate the same. The head 21 and its extension 22 also form a safety device by which the rotation of the latch to locking position is insured before the rim can be mounted upon the wheel. In order to accomplish this purpose the felly band is provided with a plate or lug 23, the position of which is indicated in dotted lines in Fig. 3.

From an inspection of Fig. 3 it will be seen that if it be attempted to place the rim upon the wheel while the latch is in inoperative position, as indicated in full lines in Fig. 3, the extension 22 will engage the end of the plate 23 and either prevent the placing of the rim upon the wheel, or, if the rim is urged upon its seat with sufficient force, the lug 23 will force the latch around into operative position. It will thus be seen that when the rim is mounted upon the wheel the latch 15 must necessarily be in locking engagement with the lug 13. The engagement of the beveled face 19 with the beveled face 20 holds the end 24 of the split ring 11 in its position in engagement with the endless ring 8. With the ends of the split ring beveled, as shown, the beveled portion of the end 24 overlaps the beveled portion of the opposite end 25 of the ring, and the end 25 is thus also locked in position. If desired separate means may be provided for locking the end 25 of the ring in position, although this is unnecessary where the ends of the ring are beveled as shown. If additional means are used for locking the end 25 of the ring, these means may consist in a duplication of the latch 15 as shown in Fig. 9, or they may consist in the use of a nut such as shown in Figs. 4, 5 and 6 screwing upon the valve-stem which passes through a hole 26 in the driving plate 27 secured to the under-side of the rim 8, the edge of the nut overlapping the edge of one of the lugs 13, as shown in Figs. 5 and 6. The plate 23, already described, may be utilized as one of the driving plates, in which case the plate 27 is received between the plate 23 and another driving plate 28 secured to the felly band. This type is illustrated in detail in Figs. 7 and 8.

Figs. 4, 5 and 6 show a modification of my invention in which the latch 15 is dispensed with, the ends of the ring 11 being locked in position solely by means of a nut 29 screwing on the valve-stem 30, the edge of the nut overlapping one of the lugs 13. The endless member 8 of the rim is provided with lugs 10 passing through slots in the lugs 13, as in the construction already described. The endless ring 8 is also provided with the driving plate 27 which is received between the driving plates 23 and 28 secured to the felly band. If only the nut 29 is to be relied upon to secure both ends of the split ring 11 in position, the ends of the ring are so beveled that the beveled portion of the end 25 will overlap the beveled portion of the end 24 and thus retain the end 24 in position.

In Figs. 7 and 8 I have shown a rim equipped both with the latch 15 and the nut 29 mounted upon the valves stem 30, the construction and mode of operation of the individual parts being the same as those of the parts heretofore described and similarly numbered.

Fig. 9 illustrates a further modification in which the rim is provided with a double latch construction. In addition to the latch 15, the construction and use of which has been described in connection with Figs. 1, 2 and 3, I have provided a second latch 31 which engages one of the lugs 13 in the same manner that the latch 15 engages its particular lug. The head 32 of the latch 31 is provided with an extension 33 corresponding to the extension 22 of the latch 15. These extensions face each other so that when the parts are swung into inoperative position the rim may not be placed upon the felly without first rotating the latches into their normal or operative position, that shown in Fig. 9, in which the extensions on the heads of the latches engage the driving plates 23 and 28 and are thereby prevented from rotating into such position that the ends of the split ring will be released and the untimely disassembling of the rim prevented.

Having thus described certain preferred embodiments of my invention, but without desiring to limit myself to the details thereof any further than as specified in certain of the more restricted claims hereto appended, I claim:

1. A tire-carrying rim for vehicle wheels comprising two rings, an endless ring having a tire-retaining flange at one edge thereof and having a series of downwardly turned lugs at the other edge thereof, and a ring transversely split on a plane inclined to that of the major plane of the wheel and to the cylindrical surface of the rim at the point where the rim is split, said ring having a tire-retaining flange at one edge thereof, and having at the other edge thereof a series of offset slotted lugs, said lugs projecting beneath the edge of the endless ring, the lugs on the endless ring entering the slots in the lugs on the split ring.

2. A tire-carrying rim for vehicle wheels comprising a split ring and an endless ring adapted to inclose a portion of said split ring, each of said rings carrying at its outer edge tire-retaining means, one of said rings being provided with a circumferential series of slots and the other of said rings carrying a plurality of lugs adapted to enter said slots, one end of said split ring overlapping the other end thereof, and means for locking the overlapping end of said split ring to the endless ring, whereby both ends of said split ring are retained in position with relation to said endless ring.

3. A tire-carrying rim for vehicle wheels comprising a split ring and an endless ring adapted to inclose a portion of said split ring, each of said rings carrying at its outer edge tire-retaining means, one of said rings being provided with a circumferential series of slots, and the other of said rings carrying a plurality of lugs adapted to enter said slots, and means for locking an end of said split ring to the endless ring comprising a latch pivoted to the under-surface of said split ring, said latch having a portion engaging a portion of the end of said split ring when the latch is turned to operative position.

4. A tire-carrying rim for vehicle wheels comprising two rings, an endless ring having a tire-retaining flange at one edge thereof and having a series of downwardly turned lugs at the other edge thereof, and a transversely split ring having a tire-retaining flange at one edge thereof, and having at the other edge thereof a series of offset slotted lugs, said lugs projecting beneath the edge of the endless ring, the lugs on the endless ring entering the slots in the lugs on the split ring, and means for locking an end of said split ring to said endless ring comprising a latch pivoted to the under-surface of said endless ring, said latch having a portion engaging and overlying one of the lugs on the split ring when the latch is turned to operative position.

5. A tire-carrying rim for vehicle wheels comprising two rings, an endless ring having a tire-retaining flange at one edge thereof, and having a series of downwardly turned lugs at the other edge thereof, and a transversely split ring having a tire-retaining flange at one edge thereof, and having at the other edge thereof a series of offset slotted lugs, said lugs projecting beneath the edge of the endless ring, the lugs on the endless ring entering the slots in the lugs on the split ring, and means for locking an end of said split ring to said endless ring comprising a latch pivoted to the under-surface of said endless ring, said latch having an undercut edge portion of curved outline adapted to engage with a beveled portion of one of the lugs on the split ring when the latch is turned to operative position.

6. A tire-carrying rim for vehicle wheels comprising two rings, an endless ring having a tire-retaining flange at one edge thereof, and having a series of downwardly turned lugs at the other edge thereof, and a transversely split ring having a tire retaining flange at one edge thereof, and having at the other edge thereof a series of offset slotted lugs, said lugs projecting beneath the edge of the endless ring, the lugs on the endless ring entering the slots in the lugs on the split ring, the split ring being transversely split in a plane inclined to the surface of the cylindrical part of the rim at the point where the ring is split, and means for locking the overhanging end of the split ring to the endless ring comprising a latch pivoted to the under-side of the endless ring having a portion engaging one of the lugs upon the split rim when the latch is moved to operative position.

7. A tire-carrying rim for vehicle wheels comprising two rings, an endless ring having a tire-retaining flange at one edge thereof, and having a series of downwardly turned lugs at the other edge thereof, and a transversely split ring having a tire-retaining flange at one edge thereof, and having at the other edge thereof a series of offset slotted lugs, said lugs projecting beneath the edge of the endless rings, the lugs on the endless ring entering the slots in the lugs on the split ring, the split ring being transversely split in a plane inclined to the surface of the cylindrical part of the rim at the point where the ring is split, means for locking the overhanging end of the split ring to the endless ring comprising a latch pivoted to the under-side of the endless ring having a portion engaging one of the lugs upon the split rim when the latch is moved to operative position, and additional means for securing the other end of the split ring to the endless ring comprising a nut adapted to screw upon the valve-stem of the tire to be carried by the rim, said nut seating against a plate secured to the under-side of the endless ring, an edge of said nut engaging one of the lugs upon said split ring.

8. A tire-carrying rim for vehicle wheels comprising two rings, an endless ring having a tire-retaining flange at one edge thereof and having a series of downwardly turned lugs at the other edge thereof, and a transversely split ring having a tire-retaining flange at one edge thereof, and having at the other edge thereof a series of offset slotted lugs, said lugs projecting beneath the edge of the endless ring, the lugs on the endless ring entering the slots in the lugs on the split ring, and means for securing an end of said split ring to said endless ring comprising a nut adapted to screw upon the valve-stem of the tire to be carried by said rim, said nut seating against a plate secured to the under-side of said endless ring, the edge of said nut engaging one of the lugs on said split ring.

9. In a vehicle wheel, in combination, a felly member, a driving plate secured to the surface thereof, a tire-carrying rim and means for securing said rim to said felly member, said rim comprising a split ring and an endless ring adapted to inclose a portion of said split ring, each of said rings carrying at its outer edge tire-retaining means, interlocking means on said split and endless rings preventing lateral separation of said rings when said split ring is expanded within said endless ring, and a latch for locking one end of said split ring to said endless ring, said latch having a portion lying in the path of said driving plate when the latch is in inoperative position, whereby the said tire-carrying rim cannot be mounted upon said felly member except when the latch is in operative position.

10. In a vehicle wheel, in combination, a felly member, a driving plate secured to the surface thereof, a tire-carrying rim and means for securing said rim to said felly member, said rim comprising an endless ring having tire-retaining means at one edge thereof, and having at the other edge thereof a plurality of downwardly turned lugs, and a ring transversely split in a plane inclined to the cylindrical surface of the rim at the point where the rim is split, said split ring having a plurality of offset lugs projecting therefrom beneath the edge of the endless ring, said lugs being slotted, the down-turned lugs of said endless ring entering said slots, and means for locking the over-hanging end of said split ring to said endless ring comprising a latch pivoted to the under-surface of said endless ring having a portion adapted to over-hang one of the lugs on said endless ring when the latch is moved to operative position, said latch having a portion projecting into the path of said driving plate when the latch is in inoperative position, whereby the setting of said latch in operative position is insured when the rim is secured upon the felly member.

11. A tire-carrying rim for vehicle wheels comprising a split ring and an endless ring adapted to inclose a portion of said split ring, each of said rings carrying at its outer edge tire-retaining means, one of said rings being provided with a circumferential series of slots, and the other of said rings carrying a plurality of lugs adapted to enter said slots, said split ring being split in a plane inclined to the edges of said ring and inclined to the surface of the cylindrical portion of the rim at the point where the rim is split.

JAMES H. WAGENHORST.

Witnesses:
 SEWARD DAVIS,
 EDMUND QUINCY MOSES.